US007081511B2

(12) United States Patent
Wu et al.

(10) Patent No.: US 7,081,511 B2
(45) Date of Patent: Jul. 25, 2006

(54) PROCESS FOR MAKING POLYESTERS

(75) Inventors: Hengpeng Wu, Hillsborough, NJ (US);
Jianhui Shan, Pennington, NJ (US);
Shuji Sue Ding-Lee, Branchburg, NJ (US); Zhong Xhiang, Somerset, NJ (US); Eleazor B. Gonzalez, Bloomfield, NJ (US); Mark O. Neisser, Whitehouse Station, NJ (US)

(73) Assignee: AZ Electronic Materials USA Corp., Somerville, NJ (US)

( * ) Notice: Subject to any disclaimer, the term of this patent is extended or adjusted under 35 U.S.C. 154(b) by 124 days.

(21) Appl. No.: 10/817,987

(22) Filed: Apr. 5, 2004

(65) Prior Publication Data
US 2005/0234201 A1 Oct. 20, 2005

(51) Int. Cl.
*C08G 63/00* (2006.01)
(52) U.S. Cl. ............ 528/272; 428/411.1; 428/480; 525/480; 528/271
(58) Field of Classification Search ............ 428/411.1, 428/480; 525/480; 528/271, 272
See application file for complete search history.

(56) References Cited

U.S. PATENT DOCUMENTS

| 2,585,323 A | 2/1952 | Elwell et al. |
| 3,483,169 A | 12/1969 | Case et al. |
| 3,497,472 A | 2/1970 | Driscoll |
| 3,856,752 A | 12/1974 | Bateman et al. |
| 3,919,172 A | 11/1975 | Rhein et al. |
| 4,196,129 A | 4/1980 | Rhein et al. |
| 4,491,628 A | 1/1985 | Ito et al. |
| 4,912,160 A | 3/1990 | Shalati |
| 5,069,997 A | 12/1991 | Schwaim et al. |
| 5,350,660 A | 9/1994 | Urano et al. |
| 5,395,918 A | 3/1995 | Harris et al. |
| 5,480,964 A | 1/1996 | Harris et al. |
| 5,498,690 A | 3/1996 | Kim et al. |
| 5,585,219 A | 12/1996 | Kaimoto et al. |
| 5,596,073 A | 1/1997 | Michael et al. |
| 5,935,760 A | 8/1999 | Shao et al. |
| 5,962,621 A | 10/1999 | Beckerdite et al. |
| 6,664,363 B1 | 12/2003 | Faunce |
| 2004/0101779 A1 | 5/2004 | Wu et al. |

FOREIGN PATENT DOCUMENTS

| EP | 0 789 278 A2 | 8/1997 |
| EP | 0 794 458 A2 | 9/1997 |
| EP | 0 583 205 B1 | 8/1998 |
| GB | 2 320 718 A | 7/1998 |
| JP | 59 088770 | 1/1984 |
| WO | WO 97/33198 | 9/1997 |
| WO | WO 00/17712 | 3/2000 |
| WO | WO 00/67072 | 11/2000 |

OTHER PUBLICATIONS

Notification of Transmittal (Form PCT/ISA/220), International Search Report (Form PCT/ISA/210), and Written Opinion (Form PCT/ISA/327) for PCT/IB2005/000879.
International Preliminary Examination Report for PCT/EP2003/12383.
George J. Cernigliaro et al., "Dissolution Rate Modifying Chemistry: Interaction of Base-soluble and Base-insoluble Non-actinic Dyes with Novolak Polymers and Novolak-based Positive Photoresists", SPIE vol. 1086, 1989, pp. 106-116.
PCT/ISA/210 International Search Report Mailed Mar. 19, 2004—3 Pages.

*Primary Examiner*—Terressa Boykin
(74) *Attorney, Agent, or Firm*—Alan P. Kass

(57) ABSTRACT

The present invention relates to a process for making a polyester where a dianhydride is reacted with a diol. The resulting polyester can be further reacted with a compound selected from aromatic oxides, aliphatic oxides, alkylene carbonates, alcohols, and mixtures thereof.

25 Claims, No Drawings

PROCESS FOR MAKING POLYESTERS

FIELD OF THE INVENTION

The present invention relates to novel process for preparing polyesters. Such polymers are useful in compositions in the coatings, adhesives, sealants, elastomers, and photolithography fields.

BACKGROUND

Polyesters with terminal reactive groups are widely used in thermosetting coatings and articles. To achieve high crosslinking density, low molecular weights are preferred for such polyesters because high molecular weights lead to insufficient reactive groups. Low molecular polyesters are usually oily oligomers which might not possess desirable properties, e.g., glass transition temperatures, thermal stability, easiness of purification, etc. These types of polyesters are not suitable for applications where both reasonably high molecular weights and high crosslinking density are required. For example, when used in antireflective coatings in photolithography, polyesters are required to have relatively high molecular weights for high thermal stability. In the meantime, high contents of reactive groups in the polyesters are needed to achieve high crosslinking density to prevent intermixing with photoresists.

In general, for high crosslinking to occur in compositions containing polyesters, polyesters preferably have pendant reactive groups. The number of pendant reactive groups in such a polyester can be easily adjusted to obtain desired crosslinking properties. The number of pendant reactive groups is independent of the molecular weight of the polyester.

Reactive groups in polyesters suitable for crosslinking chemistry are usually hydroxyl, carboxylic acid, etc. However, polyesters are normally prepared by condensation polymerization using monomers bearing the same reactive groups. This usually makes it very difficult to prepare high molecular weight polyesters with high contents of reactive groups. For some applications, e.g., powder coating, both high molecular and high contents of reactive groups can be achieved by preparing branched polyesters which are partially crosslinked. Those partially crosslinked polyesters usually have very limited solubility in organic solvents. For applications where polyesters need to be dissolved in solvents, highly branched polyesters are usually not very useful.

The present invention relates to a novel polyester preparation method that can lead to high molecular weight polyesters with high contents of reactive groups. Polyesters prepared by this method can be linear and/or branched and/or partially crosslinked and have good solubility in common organic solvents used in the end product in which the polyester is used.

SUMMARY OF THE INVENTION

The present invention relates to a process for making a polyester.

The process comprises reacting a dianhydride with a diol, optionally in the presence of a catalyst, in a media which includes a solvent in which the polyester is insoluble, the dianhydride and the diol being present in substantially stoichiometric amounts. The polyester formed can be further processed by either (A) partially or fully esterifying carboxyl groups on the polyester with a capping compound selected from monohydric alcohols and mixtures thereof optionally in the presence of a catalyst or (B) converting some or all carboxyl groups on the polyester to hydroxyl groups by reacting the carboxyl groups with a hydroxyl-forming compound selected from aromatic oxide, aliphatic oxide, alkylene carbonate and mixtures thereof optionally in the presence of a catalyst.

The present invention also relates to a process for making a polyester which comprises: (i) reacting a dianhydride with a diol, optionally in the presence of a catalyst, in a media which includes a solvent in which the polyester is insoluble, the dianhydride and the diol being present in substantially stoichiometric amounts; (ii) separating the polyester from the media of step (i); and (iii) partially or fully esterifying carboxyl groups on the polyester of step (ii) with a capping compound selected from monohydric alcohols and mixtures thereof optionally in the presence of a catalyst.

The present invention also relates to a process for making a polyester which comprises: (i) reacting a dianhydride with a diol, optionally in the presence of a catalyst, in a media which includes a solvent in which the polyester is insoluble, the dianhydride and the diol being present in substantially stoichiometric amounts; (ii) separating the polyester from the media of step (i); and (iii) converting some or all carboxyl groups on the polyester of step (ii) to hydroxyl groups by reacting the carboxyl groups with a hydroxyl-forming compound selected from aromatic oxide, aliphatic oxide, alkylene carbonate and mixtures thereof optionally in the presence of a catalyst.

The present invention also relates to a process for making a polyester which comprises: (i) reacting a dianhydride with a diol, optionally in the presence of a catalyst, in a media which includes a solvent in which the polyester is insoluble, the dianhydride and the diol being present in substantially stoichiometric amounts; and (ii) partially or fully esterifying carboxyl groups on the polyester of step (i) with a capping compound selected from monohydric alcohols and mixtures thereof optionally in the presence of a catalyst.

The present invention also relates to a process for making a polyester which comprises: (i) reacting a dianhydride with a diol, optionally in the presence of a catalyst, in a media which includes a solvent in which the polyester is insoluble, the dianhydride and the diol being present in substantially stoichiometric amounts; and (ii) converting some or all carboxyl groups on the polyester of step (i) to hydroxyl groups by reacting the carboxyl groups with a hydroxyl-forming compound selected from aromatic oxide, aliphatic oxide, alkylene carbonate and mixtures thereof optionally in the presence of a catalyst.

The present invention also relates to a process for making a polyester comprising the steps of: (i) mixing together a dianhydride, a diol, and a hydroxyl-forming compound selected from aromatic oxide, aliphatic oxide, alkylene carbonate, and mixtures thereof under reaction conditions to react the dianhydride with the diol, the dianhydride and the diol being present in substantially stoichiometric amounts; (ii) reacting the mixture of (i) under conditions to react carboxyl groups on the polyester with the hydroxyl-forming compound to convert carboxyl groups to hydroxyl groups; and (iii) separating the polyester from step (ii). Optionally, a catalyst can be added to the mixture prior to step (ii).

In the above processes, the formed polyester can be then separated from the reaction media and further used in formulating various products.

Examples of the capping compound include methanol, ethanol, propanol, isopropanol, 1-butanol, isobutanol, 2-methyl-2-butanol, 2-methyl-1-butanol, 3-methyl-1-butanol, tertiary butanol, cyclopentanol, cyclohexanol, 1-hexanol, 1-heptanol, 2-heptanol, 3-heptanol, 1-n-octanol, 2-n-octanol and the like. Examples of the hydroxyl-forming compound include styrene oxide, propylene oxide, ethylene carbonate and the like.

For the above processes, the dianhydride can have the formula

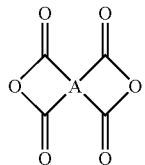
(1)

where A is a tetravalent radical selected from the group consisting of unsubstituted or substituted aliphatic, unsubstituted or substituted aromatic, unsubstituted or substituted cycloaliphatic, unsubstituted or substituted heterocyclic groups and combinations thereof. Tetravalent radical A can be selected from

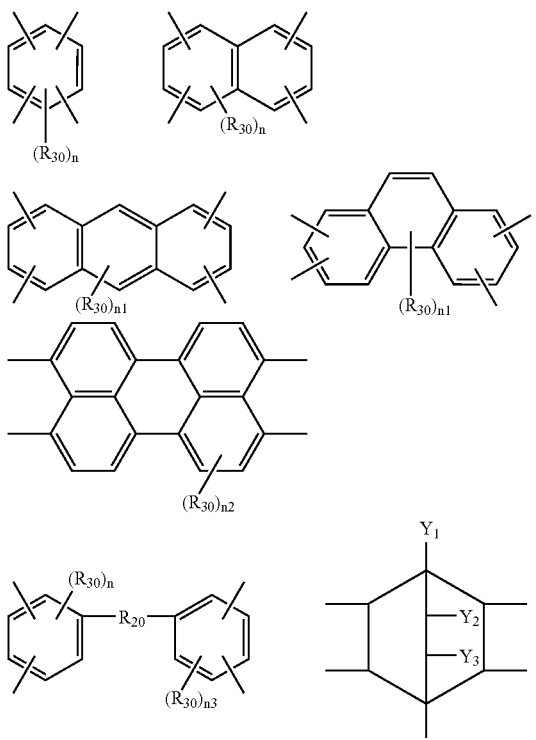

where $R_{30}$ is identical or different and is selected from hydrogen, unsubstituted or substituted hydrocarbyl group, or halogen; $Y_1$, $Y_2$, $Y_3$, and $Y_4$ are each independently selected from hydrogen and unsubstituted or substituted hydrocarbyl group; n=1 to 4, n1=1 to 6, n2=1 to 8, n3=1 to 4; and $R_{20}$ is selected from a direct bond, O, CO, S, COO, $CH_2O$, CHL, $CL_2$, $CH_2COO$, $SO_2$, CONH, CONL, NH, NL, OWO, OW, WO, WOW, and W, where L is unsubstituted or substituted hydrocarbyl group and W is unsubstituted or substituted hydrocarbylene group. Some examples of the compound of formula include

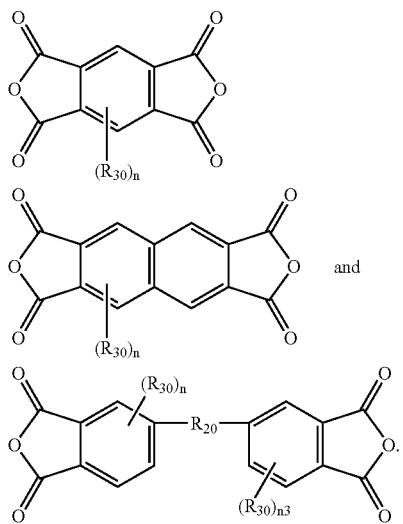
and

Examples of the dianhydride include pyromellitic dianhydride, 3,6-diphenylpyromellitic dianhydride, 3,6-bis(trifluoromethyl)pyromellitic dianhydride, 3,6-bis(methyl)pyromellitic dianhydride, 3,6-diiodopyromellitic dianhydride, 3,6-dibromopyromellitic dianhydride, 3,6-dichloropyromellitic dianhydride, 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, 2,3,3'4'-biphenyltetracarboxylic acid dianhydride, 2,2',3,3'-biphenyltetracarboxylic acid dianhydride, 2,2',6,6'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, bis(3,4-dicarboxyphenyl)ether dianhydride (4,4'-oxydiphthalic dianhydride), bis(3,4-dicarboxyphenyl) sulfone dianhydride (3,3',4,4'-diphenylsulfonetetracarboxylic dianhydride), 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride; 2,3,6,7-naphthalene tetracarboxylic acid dianhydride, 1,2,5,6-naphthalene-tetracarboxylic acid dianhydride, 1,4,5,8-naphthalenetetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, 2,3,9,10-perylene tetracarboxylic acid dianhydride, 4,4'-(1,4-phenylene) bis(phthalic acid) dianhydride, 4,4'-(1,3-phenylene) bis(phthalic acid) dianhydride, 4,4'-oxydi(1,4-phenylene)bis (phthalic acid)dianhydride, 4,4'-methylenedi(1,4-phenylene)bis(phthalic acid)dianhydride, hydroquinonediether dianhydride, 4,4'-biphenoxy dianhydride, and bicyclo[2.2.2] oct-7-ene-2,3,5,6-tetracarboxylic dianhydride.

For the above processes, the diol can have the formula

HO—B—OH (2)

where B is an unsubstituted or substituted hydrocarbylene group. Examples of B include unsubstituted or substituted linear or branched alkylene optionally containing one or more oxygen or sulfur atoms, unsubstituted or substituted arylene, and unsubstituted or substituted aralkylene. Additional examples include methylene, ethylene, propylene, butylene, 1-phenyl-1,2-ethylene, 2-bromo-2-nitro-1,3-propylene, 2-bromo-2-methyl-1,3-propylene, —$CH_2OCH_2$—, —$CH_2CH_2OCH_2CH_2$—, —$CH_2CH_2SCH_2CH_2$—, or —$CH_2CH_2SCH_2CH_2SCH_2CH_2$—.

For the processes of the present invention, the dianhydride can be a mixture of one or more dianhydrides. Additionally, the diol can be a mixture of one or more diols.

The present invention provides a novel process for making polyesters using a dianhydride and a diol as major reactants. While polyfunctional anhydrides have been used to chain-extend hydroxyl-terminated prepolymers to increase molecular weights, reacting a dianhydride and a diol to prepare polyesters is considered impractical. It has surprisingly been found by the inventors that polyesters with relatively high molecular weights can readily be prepared using the present invention.

The polyester, made by reacting a dianhydride with a diol, can be further processed either by (A) partially or fully esterifying carboxyl groups on the polyester with a capping compound in the presence of a catalyst or (B) converting some or all carboxyl groups on the polyester to hydroxyl groups by reacting the carboxyl groups with a hydroxyl-forming compound. Processing under (A) above generally results in a linear polyester. Processing under (B) above can result in either generally linear polyesters or partially crosslinked polyesters, depending upon the temperature at which the hydroxyl-forming compound is reacted with the polyester. Generally, if the reaction temperature is about less than or equal to 80° C., the resulting polyester is generally linear. Generally, if the reaction temperature is about greater than or equal to 80° C., the resulting polyester generally has some partial crosslinking occurring. Catalysts can be used to enhance the reaction.

Processing under (B) is normally carried out at atmospheric pressure under inert gas atmosphere. However, if the hydroxyl-forming compound has a boiling point lower than the reaction temperature and no additional solvent is used, increased pressure can be used.

DESCRIPTION OF THE INVENTION

The present invention relates to a process for making a polyester.

The process comprises reacting a dianhydride with a diol, optionally in the presence of a catalyst, in a media which includes a solvent in which the polyester is insoluble, the dianhydride and the diol being present in substantially stoichiometric amounts. The polyester formed can be further processed by either (A) partially or fully esterifying carboxyl groups on the polyester with a capping compound selected from monohydric alcohols and mixtures thereof optionally in the presence of a catalyst or (B) converting some or all carboxyl groups on the polyester to hydroxyl groups by reacting the carboxyl groups with a hydroxyl-forming compound selected from aromatic oxide, aliphatic oxide, alkylene carbonate and mixtures thereof optionally in the presence of a catalyst.

The present invention also relates to a process for making a polyester which comprises: (i) reacting a dianhydride with a diol, optionally in the presence of a catalyst, in a media which includes a solvent in which the polyester is insoluble, the dianhydride and the diol being present in substantially stoichiometric amounts; (ii) separating the polyester from the media of step (i); and (iii) partially or fully esterifying carboxyl groups on the polyester of step (ii) with a capping compound selected from monohydric alcohols and mixtures thereof optionally in the presence of a catalyst.

The present invention also relates to a process for making a polyester which comprises: (i) reacting a dianhydride with a diol, optionally in the presence of a catalyst, in a media which includes a solvent in which the polyester is insoluble, the dianhydride and the diol being present in substantially stoichiometric amounts; (ii) separating the polyester from the media of step (i); and (iii) converting some or all carboxyl groups on the polyester of step (ii) to hydroxyl groups by reacting the carboxyl groups with a hydroxyl-forming compound selected from aromatic oxide, aliphatic oxide, alkylene carbonate and mixtures thereof optionally in the presence of a catalyst.

The present invention also relates to a process for making a polyester which comprises: (i) reacting a dianhydride with a diol, optionally in the presence of a catalyst, in a media which includes a solvent in which the polyester is insoluble, the dianhydride and the diol being present in substantially stoichiometric amounts; and (ii) partially or fully esterifying carboxyl groups on the polyester of step (i) with a capping compound selected from monohydric alcohols and mixtures thereof optionally in the presence of a catalyst.

The present invention also relates to a process for making a polyester which comprises: (i) reacting a dianhydride with a diol, optionally in the presence of a catalyst, in a media which includes a solvent in which the polyester is insoluble, the dianhydride and the diol being present in substantially stoichiometric amounts; and (ii) converting some or all carboxyl groups on the polyester of step (i) to hydroxyl groups by reacting the carboxyl groups with a hydroxyl-forming compound selected from aromatic oxide, aliphatic oxide, alkylene carbonate and mixtures thereof optionally in the presence of a catalyst.

The present invention also relates to a process for making a polyester comprising the steps of: (i) mixing together a dianhydride, a diol, and a hydroxyl-forming compound selected from aromatic oxide, aliphatic oxide, alkylene carbonate, and mixtures thereof under reaction conditions to react the dianhydride with the diol, the dianhydride and the diol being present in substantially stoichiometric amounts; (ii) reacting the mixture of (i) under conditions to react carboxyl groups on the polyester with the hydroxyl-forming compound to convert carboxyl groups to hydroxyl groups; and (iii) separating the polyester from step (ii). Optionally, a catalyst can be added to the mixture prior to step (ii).

In the above processes, the formed polyester can be then separated from the reaction media and further used in formulating various products.

Examples of the capping compound include methanol, ethanol, propanol, isopropanol, 1-butanol, isobutanol, 2-methyl-2-butanol, 2-methyl-1-butanol, 3-methyl-1-butanol, tertiary butanol, cyclopentanol, cyclohexanol, 1-hexanol, 1-heptanol, 2-heptanol, 3-heptanol, 1-n-octanol, 2-n-octanol and the like. Examples of the hydroxyl-forming compound include styrene oxide, propylene oxide, ethylene carbonate and the like.

For the above processes, the dianhydride can have the formula

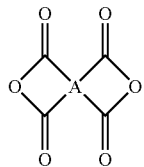

where A is a tetravalent radical selected from the group consisting of unsubstituted or substituted aliphatic, unsubstituted or substituted aromatic, unsubstituted or substituted cycloaliphatic, unsubstituted or substituted heterocyclic groups and combinations thereof. Tetravalent radical A can be selected from

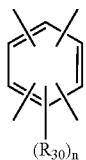 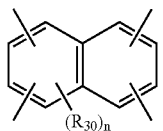

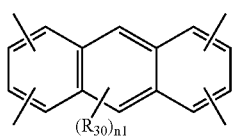 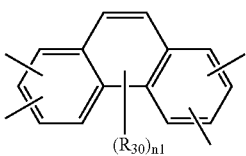

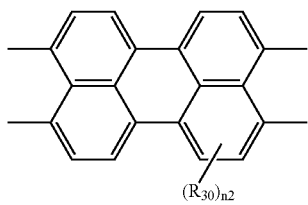

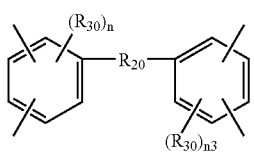 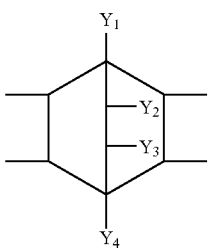

where $R_{30}$ is identical or different and is selected from hydrogen, unsubstituted or substituted hydrocarbyl group, or halogen; $Y_1$, $Y_2$, $Y_3$, and $Y_4$ are each independently selected from hydrogen and unsubstituted or substituted hydrocarbyl group; n=1 to 4, n1=1 to 6, n2=1 to 8, n3=1 to 4; and $R_{20}$ is selected from a direct bond, O, CO, S, COO, $CH_2O$, CHL, $CL_2$, $CH_2COO$, $SO_2$, CONH, CONL, NH, NL, OWO, OW, WO, WOW, and W, where L is unsubstituted or substituted hydrocarbyl group and W is unsubstituted or substituted hydrocarbylene group. Some examples of the compound of formula include

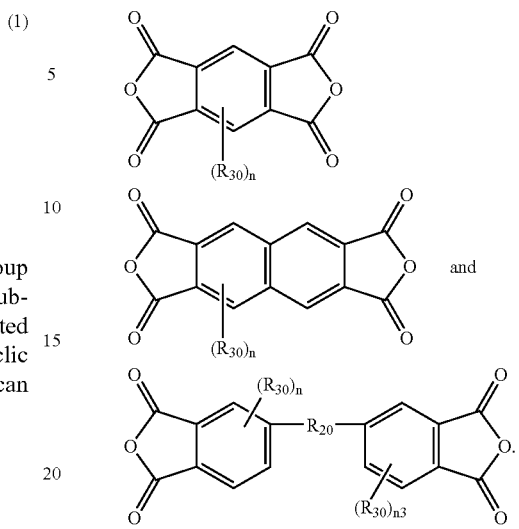

and

Examples of the dianhydride include pyromellitic dianhydride, 3,6-diphenylpyromellitic dianhydride, 3,6-bis(trifluoromethyl)pyromellitic dianhydride, 3,6-bis(methyl)pyromellitic dianhydride, 3,6-diiodopyromellitic dianhydride, 3,6-dibromopyromellitic dianhydride, 3,6-dichloropyromellitic dianhydride, 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, 2,3,3'4'-biphenyltetracarboxylic acid dianhydride, 2,2',3,3'-biphenyltetracarboxylic acid dianhydride, 2,2',6,6'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, bis(3,4-dicarboxyphenyl)ether dianhydride (4,4'-oxydiphthalic dianhydride), bis(3,4-dicarboxyphenyl) sulfone dianhydride (3,3',4,4'-diphenylsulfonetetracarboxylic dianhydride), 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride; 2,3,6,7-naphthalene tetracarboxylic acid dianhydride, 1,2,5,6-naphthalene-tetracarboxylic acid dianhydride, 1,4,5,8-naphthalenetetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, 2,3,9,10-perylene tetracarboxylic acid dianhydride, 4,4'-(1,4-phenylene) bis(phthalic acid) dianhydride, 4,4'-(1,3-phenylene) bis(phthalic acid) dianhydride, 4,4'-oxydi(1,4-phenylene)bis (phthalic acid)dianhydride, 4,4'-methylenedi(1,4-phenylene)bis(phthalic acid)dianhydride, hydroquinonediether dianhydride, 4,4'-biphenoxy dianhydride, and bicyclo[2.2.2] oct-7-ene-2,3,5,6-tetracarboxylic dianhydride.

For the above processes, the diol can have the formula $$HO-B-OH \qquad (2)$$

where B is an unsubstituted or substituted hydrocarbylene group. Examples of B include unsubstituted or substituted linear or branched alkylene optionally containing one or more oxygen or sulfur atoms, unsubstituted or substituted arylene, and unsubstituted or substituted aralkylene. Additional examples include methylene, ethylene, propylene, butylene, 1-phenyl-1,2-ethylene, 2-bromo-2-nitro-1,3-propylene, 2-bromo-2-methyl-1,3-propylene, —CH$_2$OCH$_2$—, —CH$_2$CH$_2$OCH$_2$CH$_2$—, —CH$_2$CH$_2$SCH$_2$CH$_2$—, or —CH$_2$CH$_2$SCH$_2$CH$_2$SCH$_2$CH$_2$—.

For the processes of the present invention, the dianhydride can be a mixture of one or more dianhydrides. Additionally, the diol can be a mixture of one or more diols.

The present invention provides a novel process for making polyesters using a dianhydride and a diol as major reactants. While polyfunctional anhydrides have been used to chain-extend hydroxyl-terminated prepolymers to increase molecular weights, reacting a dianhydride and a diol to prepare polyesters is considered impractical. It has surprisingly been found by the inventors that polyesters with relatively high molecular weights can readily be prepared using the present invention.

The polyester, made by reacting a dianhydride with a diol, can be further processed either by (A) partially or fully esterifying carboxyl groups on the polyester with a capping compound in the presence of a catalyst or (B) converting some or all carboxyl groups on the polyester to hydroxyl groups by reacting the carboxyl groups with a hydroxyl-forming compound. Processing under (A) above generally results in a linear polyester. Processing under (B) above can result in either generally linear polyesters or partially crosslinked polyesters, depending upon the temperature at which the hydroxyl-forming compound is reacted with the polyester. Generally, if the reaction temperature is about less than or equal to 80° C., the resulting polyester is generally linear. Generally, if the reaction temperature is about greater than or equal to 80° C., the resulting polyester generally has some partial crosslinking occurring. Catalysts can be used to enhance the reaction.

Processing under (B) is normally carried out at atmospheric pressure under inert gas atmosphere. However, if the hydroxyl-forming compound has a boiling point lower than the reaction temperature and no additional solvent is used, increased pressure can be used.

For the above processes, the dianhydride can have the formula

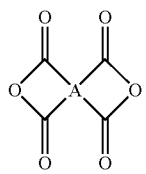

(1)

where

A is a tetravalent radical selected from the group consisting of unsubstituted or substituted aliphatic, unsubstituted or substituted aromatic, unsubstituted or substituted cycloaliphatic, unsubstituted or substituted heterocyclic groups and combinations thereof. Tetravalent radical A can be selected from

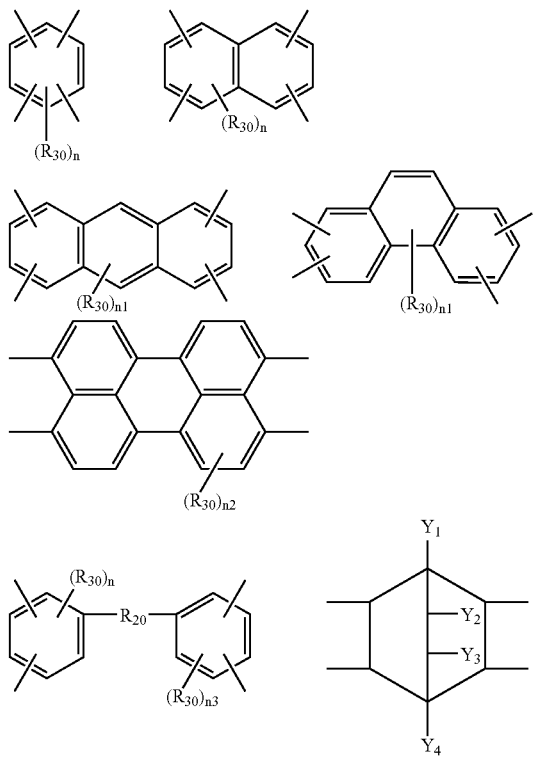

where $R_{30}$ is identical or different and is selected from hydrogen, unsubstituted or substituted hydrocarbyl group, or halogen; $Y_1$, $Y_2$, $Y_3$, and $Y_4$ are each independently selected from hydrogen and unsubstituted or substituted hydrocarbyl group; n=1 to 4, n1=1 to 6, n2=1 to 8, n3=1 to 4; and $R_{20}$ is selected from a direct bond, O, CO, S, COO, CH$_2$O, CHL, CL$_2$, CH$_2$COO, SO$_2$, CONH, CONL, NH, NL, OWO, OW, WO, WOW, and W, where L is unsubstituted or substituted hydrocarbyl group and W is unsubstituted or substituted hydrocarbylene group. Some examples of the compound of formula include

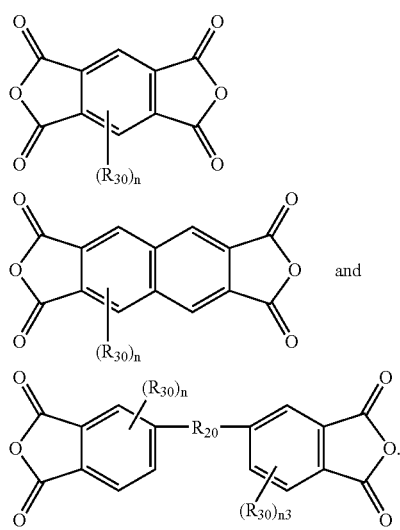

Examples of the dianhydride include pyromellitic dianhydride, 3,6-diphenylpyromellitic dianhydride, 3,6-bis(trifluoromethyl)pyromellitic dianhydride, 3,6-bis(methyl)pyromellitic dianhydride, 3,6-diiodopyromellitic dianhydride, 3,6-dibromopyromellitic dianhydride, 3,6-dichloropyromellitic dianhydride, 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, 2,3,3'4'-biphenyltetracarboxylic acid dianhydride, 2,2',3,3'-biphenyltetracarboxylic acid dianhydride, 2,2',6,6'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, bis(3,4-dicarboxyphenyl)ether dianhydride (4,4'-oxydiphthalic dianhydride), bis(3,4-dicarboxyphenyl) sulfone dianhydride (3,3',4,4'-diphenylsulfonetetracarboxylic dianhydride), 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride; 2,3,6,7-naphthalene tetracarboxylic acid dianhydride, 1,2,5,6-naphthalene-tetracarboxylic acid dianhydride, 1,4,5,8-naphthalenetetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, 2,3,9,10-perylene tetracarboxylic acid dianhydride, 4,4'-(1,4-phenylene) bis(phthalic acid) dianhydride, 4,4'-(1,3-phenylene) bis(phthalic acid) dianhydride, 4,4'-oxydi(1,4-phenylene)bis (phthalic acid)dianhydride, 4,4'-methylenedi(1,4-phenylene)bis(phthalic acid)dianhydride, hydroquinonediether dianhydride, 4,4'-biphenoxy dianhydride, and bicyclo[2.2.2] oct-7-ene-2,3,5,6-tetracarboxylic dianhydride.

For the above processes, the diol can have the formula

HO—B—OH     (2)

where B is an unsubstituted or substituted hydrocarbylene group. Examples of B include unsubstituted or substituted linear or branched alkylene optionally containing one or more oxygen or sulfur atoms, unsubstituted or substituted arylene, and unsubstituted or substituted aralkylene. Additional examples include methylene, ethylene, propylene, butylene, 1-phenyl-1,2-ethylene, 2-bromo-2-nitro-1,3-propylene, 2-bromo-2-methyl-1,3-propylene, —CH$_2$OCH$_2$—, —CH$_2$CH$_2$OCH$_2$CH$_2$—, —CH$_2$CH$_2$SCH$_2$CH$_2$—, or —CH$_2$CH$_2$SCH$_2$CH$_2$SCH$_2$CH$_2$—.

For the processes of the present invention, the dianhydride can be a mixture of one or more dianhydrides. Additionally, the diol can be a mixture of one or more diols.

As used herein, "substantially stoichiometric amount" refers to molar ratios of dianhydride/diol of about 1, and generally between about 0.90 to about 1.20. Typically, a slight excess of either dianhydride or diol can be used in order to control molecular weight.

As used herein, the term "hydrocarbyl group" is used in its ordinary sense, which is well-known to those skilled in the art, as a univalent group formed by removing one hydrogen atom from a moiety having a predominantly hydrocarbon character. Examples of hydrocarbyl groups, which can be unsubstituted or substituted, include:

(1) hydrocarbon groups, that are, aliphatic (e.g., alkyl, alkylenyl or alkenyl), alicyclic (e.g., cycloalkyl, cycloalkenyl), aromatic, aliphatic-, and alicyclic-substituted aromatic substituents, as well as cyclic substituents wherein the ring is completed through another portion of the molecule (e.g., two substituents together form an alicyclic radical); monocyclic or polycyclic alkylene, arylene, aralkylene. Examples of the monocyclic cycloalkylene group can have from 4 to 50 carbon atoms, and include such as, for example, cyclopentylene and cyclohexylene groups, and the polycyclic cycloalkylene group can have from 5 to 50 carbon atoms and include such as, for example, 7-oxabicyclo[2,2,1]heptylene, norbornylene, adamantylene, diamantylene, and triamantylene.

Examples of the arylene group include monocyclic and polycyclic groups such as, for example, phenylene, naphthylene, biphenyl-4,4'-diyl, biphenyl-3,3'-diyl, and biphenyl-3,4'-diyl groups.

Aryl refers to an unsaturated aromatic carbocyclic group of from 6 to 50 carbon atoms having a single ring or multiple condensed (fused) rings and include, but are not limited to, for example, phenyl, tolyl, dimethylphenyl, 2,4,6-trimethylphenyl, naphthyl, anthryl and 9,10-dimethoxyanthryl groups.

Aralkyl refers to an alkyl group containing an aryl group. It is a hydrocarbon group having both aromatic and aliphatic structures, that is, a hydrocarbon group in which an alkyl hydrogen atom is substituted by an aryl group, for example, tolyl, benzyl, phenethyl and naphthylmethyl groups.

(2) hydrocarbon groups that contain atoms other than carbon and hydrogen but are predominantly hydrocarbon in nature, where examples of other atoms are sulfur, oxygen or nitrogen, which may be present alone (such as thio or ether) or as functional linkages such as ester, carboxy, carbonyl, etc.;

(3) substituted hydrocarbon groups, that is, substituents containing non-hydrocarbon groups which, in the context of this invention, do not alter the predominantly hydrocarbon substituent (e.g., halogen, hydroxy, alkoxy, mercapto, alkylmercapto, nitro, nitroso, and sulfoxy);

(4) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

Examples of hydrocarbyl groups are substituted or unsubstituted linear or branched aliphatic ($C_{1-50}$) alkyl group, substituted or unsubstituted linear or branched aliphatic ($C_{1-50}$) alkylene group, substituted or unsubstituted linear or branched thio-alkylene aliphatic ($C_{1-50}$) group, substituted or unsubstituted cycloalkylene, substituted or unsubstituted benzyl, alkoxy alkylene, alkoxyaryl, substituted aryl, hetero cycloalkylene, heteroaryl, oxocyclohexyl, cyclic lactone, benzyl, substituted benzyl, hydroxy alkyl, hydroxyalkoxyl, alkoxy alkyl, alkoxyaryl, alkylaryl, alkenyl, substituted aryl, hetero cycloalkyl, heteroaryl, nitroalkyl, haloalkyl, alkylimide, alkyl amide, or mixtures thereof.

When Z is hydrocarbyl group, examples include alkyl, cycloalkyl, substituted cycloalkyl, oxocyclohexyl, cycliclactone, benzyl, substituted benzyl, hydroxy alkyl, hydroxyalkoxyl, alkoxy alkyl, alkoxyaryl, alkylaryl, alkenyl, substituted aryl, hetero cycloalkyl, heteroaryl, nitro, halogen, haloalkyl, ammonium, alkyl ammonium, —(CH$_2$)$_2$OH, —O(CH$_2$)$_2$O(CH$_2$)OH, —(OCH$_2$CH$_2$)$_k$OH (where k=1–10), or mixtures thereof.

As used herein, hydrocarbylene group is a divalent group formed by removing two hydrogen atoms from a moiety having a predominantly hydrocarbon character, the free valences of which are not engaged in a double bond. For example, hydrocarbylene groups include, but are not limited to, alkylene, thio-alkylene, cycloalkylene, arylene, examples of W set forth below and the like.

Examples of W are, without limitations, substituted or unsubstituted aliphatic (C$_1$–C$_{50}$) alkylene, substituted or unsubstituted aliphatic (C$_1$–C$_{50}$) thio-alkylene, (C$_1$–C$_{50}$) cycloalkylene, substituted (C$_1$–C$_{50}$) cycloalkylene, hydroxy alkylene, alkoxy alkylene, alkoxyarylene, alkylarylene, (C$_1$–C$_{50}$) alkenylene, biphenylene, phenylene, unsubstituted or substituted arylene, hetero cycloalkylene, heteroarylene, halo alkylene, or mixtures thereof. Examples of L are, without limitations, (C$_1$–C$_{50}$) alkyl, substituted (C$_1$–C$_{50}$) alkyl, cycloalkyl, substituted cycloalkyl, oxocyclohexyl, cyclic lactone, benzyl, substituted benzyl, hydroxy alkyl, hydroxyalkoxyl, alkoxy alkyl, alkoxyaryl, alkylaryl, alkenyl, substituted aryl, hetero cycloalkyl, heteroaryl, or mixtures thereof.

In the above definitions and throughout the present application, aliphatic refers to a predominantly hydrocarbon chain which is nonaromatic. Substituted or unsubstituted alkylene or thioalkylene (C$_1$–C$_{50}$) group means an alkylene or an thioalkylene group which is predominantly a hydrocarbon chain that may be linear or branched containing up to 50 carbon atoms, and where the substituents are those which do not typically change the hydrocarbon nature of the chain and may be all organic compounds known to those of ordinary skill in the art, such as ether, ester, hydroxyl, alkynol, cyano, nitro, acyl, halogen, phenyl and substituted phenyl. Alkyl refers to a hydrocarbon chain containing up to 50 carbon atoms, and may be methyl, ethyl, propyl, isopropyl, butyl, etc. A thioalkylene group contains one or more sulfur atoms in the chain. An oxoalkylene group contains one or more oxygen atoms in the chain. Examples of a liphatic substituted or unsubstituted alkylene (C$_1$–C$_{50}$) group which may be linear or branched, are without limitation, methylene, ethylene, propylene, isopropylene, butylenes, isobutylene, pentylene, hexylene, heptylene, octylene, methylhexylene, ethyloctylene, phenylalkylene, nitroalkylene, bromonitroalkylene and substituted phenylalkylene. An example of aliphatic substituted or unsubstituted thioalkylene (C$_1$–C$_{50}$) group is without limitation, 3,6-dithio-1, 8-octylene (also known as 1,2-bis(ethylthio)ethylene having the formula —CH$_2$CH$_2$SCH$_2$CH$_2$SCH$_2$CH$_2$—from 3,6-dithiaoctane-1,8-diol, also known at 2,2'-(ethylenethio)diethanol). The cycloalkyl groups may be mono or polycyclic, examples of which are cyclopentyl, cyclohexyl, cycloheptyl, adamantly, as well as those described above, and may be unsubstituted or substituted as described above. Aryl refers to substituted or unsubstituted aromatic groups such as phenyl or naphthyl or anthracyl. The aryl group may be part of the polymer backbone or linked to the backbone. Halogen refers to fluorine, chlorine and bromine.

Examples of B include hydrocarbylene groups as described above, for example, alkylene, thio-alkylene, oxoalkylene, aromatic or mixtures thereof, phenyl and naphthyl and substituted variations thereof. Examples include methylene, ethylene, propylene, butylene, —CH$_2$OCH$_2$—, —CH$_2$CH$_2$OCH$_2$CH$_2$—, —CH$_2$CH$_2$SCH$_2$CH$_2$—, —CH$_2$CH$_2$SCH$_2$CH$_2$SCH$_2$CH$_2$—, phenylethylene, alkylnitroalkylene, bromonitroalkylene, and the like.

Other examples include those where R$_{20}$ is CO or SO$_2$, and B is alkylene, for example, methylene, ethylene, propylene, —CH$_2$OCH$_2$—, —CH$_2$CH$_2$OCH$_2$CH$_2$—, —CH$_2$CH$_2$SCH$_2$CH$_2$—, —CH$_2$CH$_2$SCH$_2$CH$_2$SCH$_2$CH$_2$—, phenylethylene, alkylnitoalkylene, bromonitroalkylene, phenyl or naphthyl.

Examples of the diols used to synthesize the polymer of the present invention which are represented by the compound of formula (2) are, for example and include, ethylene glycol, diethylene glycol, propylene glycol, 1-phenyl-1,2-ethanediol, 2-bromo-2-nitro-1,3-propanediol, 2-methyl-2-nitro-1,3-propanediol, diethylbis(hydroxymethyl)malonate, 1,6-hexanediol, and 3,6-dithio-1,8-octanediol. Examples of aromatic diols are 2,6-bis(hydroxymethyl)-p-cresol and 2,2'-(1,2-phenylenedioxy)-diethanol, 1,4-benzenedimethanol.

The diols are condensed with dianhydride compounds of formula (1) of the present invention, examples of which include aromatic dianhydrides, examples of which include pyromellitic dianhydride, 3,6-diphenylpyromellitic dianhydride, 3,6-bis(trifluoromethyl)pyromellitic dianhydride, 3,6-bis(methyl)pyromellitic dianhydride, 3,6-diiodopyromellitic dianhydride, 3,6-dibromopyromellitic dianhydride, 3,6-dichloropyromellitic dianhydride, 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, 2,3,3'4'-biphenyltetracarboxylic acid dianhydride, 2,2',3,3'-biphenyltetracarboxylic acid dianhydride, 2,2',6,6'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, bis(3,4-dicarboxyphenyl)ether dianhydride (4,4'-oxydiphthalic dianhydride), bis(3,4-dicarboxyphenyl) sulfone dianhydride (3,3',4,4'-diphenylsulfonetetracarboxylic dianhydride), 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride; 2,3,6,7-naphthalene tetracarboxylic acid dianhydride, 1,2,5,6-naphthalene-tetracarboxylic acid dianhydride, 1,4,5,8-naphthalenetetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, 2,3,9,10-perylene tetracarboxylic acid dianhydride, 4,4'-(1,4-phenylene) bis(phthalic acid) dianhydride, 4,4'-(1,3-phenylene)bis(phthalic acid) dianhydride, 4,4'-oxydi(1,4-phenylene)bis (phthalic acid)dianhydride, 4,4'-methylenedi(1,4-phenylene)bis(phthalic acid)dianhydride, hydroquinonediether dianhydride, 4,4'-biphenoxy dianhydride, and bicyclo[2.2.2] oct-7-ene-2,3,5,6-tetracarboxylic dianhydride.

Typically a polyester is first prepared by the reaction of a dianhydride and a diol in a media which includes a solvent in which the polyester is insoluble. The polyester may be further modified by (A) partially or fully esterifying carboxyl groups on the polyester with a capping compound selected from monohydric alcohols and mixtures thereof in the presence of a catalyst or (B) converting some or all carboxyl groups on the polyester to hydroxyl groups by reacting the carboxyl groups with a hydroxyl-forming compound selected from aromatic oxide, aliphatic oxide, alkylene carbonate and mixtures thereof optionally in the presence of a catalyst.

Examples of monohydric alcohols include linear or branched $C_1$–$C_{10}$ alkanols such as methanol, ethanol, propanol, pentanol, isopropanol, 1-butanol, isobutanol, 2-methyl-2-butanol, 2-methyl-1-butanol, 3-methyl-1-butanol, tertiary butanol, benzyl alcohol, cyclopentanol, cyclohexanol, 1-hexanol, 1-heptanol, 2-heptanol, 3-heptanol, 1-n-octanol, 2-n-octanol and the like.

The hydroxyl-forming compound is selected from aromatic oxide, aliphatic oxide, alkylene carbonate and mixtures thereof.

Examples of aromatic oxides include: styrene oxide, 1,2-epoxy-phenoxypropane, glycidyl-2-methylphenyl ether, (2,3-epoxypropyl)benzene, 1-phenylpropylene oxide, stilbene oxide, 2- (or 3- or 4-)halo(chloro, fluoro, bromo, iodo) stilbene oxide, benzyl glycidyl ether, $C_{1-10}$ straight or branched chain alkyl(e.g., methyl, ethyl, propyl, butyl, sec-butyl, tert-butyl, pentyl, hexyl, heptyl, and the like etc) phenyl glycidyl ether, 4-halo(chloro, fluoro, bromo, iodo) phenyl glycidyl ether, glycidyl 4-$C_{1-10}$ straight or branched chain alkoxy(e.g., methoxy, ethoxy, propoxy, butoxy, hexyloxy, heptyloxy, and the like etc)phenyl ether, 2,6-dihalo (chloro, fluoro, bromo, iodo)benzylmethyl ether, 3,4-dibenzyloxybenzyl halide (chloride, fluoride, bromide, iodide), 2-(or 4-)methoxybiphenyl, 3,3'-(or 4,4'-)di$C_{1-10}$ straight or branched chain alkoxy (e.g., methoxy, ethoxy, propoxy, butoxy, hexyloxy, heptyloxy, and the like etc) biphenyl, 4,4'-dimethoxyoctafluorobiphenyl, 1-(or 2-)$C_{1-10}$ straight or branched chain alkoxy (e.g., methoxy, ethoxy, propoxy, butoxy, hexyloxy, heptyloxy, and the like etc) naphthalene, 2-halo(chloro, fluoro, bromo, iodo)-6-methoxynaphthalene, 2,6-di$C_{1-10}$ straight or branched chain alkoxy(e.g., methoxy, ethoxy, propoxy, butoxy, hexyloxy, heptyloxy, and the like etc)naphthalene, 2,7-di$C_{1-10}$ straight or branched chain alkoxy(e.g., methoxy, ethoxy, propoxy, butoxy, hexyloxy, heptyloxy, and the like etc)naphthalene, 1,2,3,4,5,6-hexahalo(chloro, fluoro, bromo, iodo)-7-$C_{1-10}$ straight or branched chain alkoxy(e.g., methoxy, ethoxy, propoxy, butoxy, hexyloxy, heptyloxy, and the like etc)naphthalene, 9,10-bis(4-$C_{1-10}$ straight or branched chain alkoxy(e.g., methoxy, ethoxy, propoxy, butoxy, hexyloxy, heptyloxy, and the like etc)phenyl)-anthracene, 2-$C_{1-10}$ straight or branched chain alkyl(e.g., methyl, ethyl, propyl, butyl, sec-butyl, tert-butyl, pentyl, hexyl, heptyl, and the like etc)-9,10-di$C_{1-10}$ straight or branched chain alkoxy(e.g., methoxy, ethoxy, propoxy, butoxy, hexyloxy, heptyloxy, and the like etc) anthracene, 9,10-bis(4-$C_{1-10}$ straight or branched chain alkoxy(e.g., methoxy, ethoxy, propoxy, butoxy, hexyloxy, heptyloxy, and the like etc)phenyl)-2-halo(chloro, fluoro, bromo, iodo)-anthracene, 2,3,6,7,10,11-hexamethoxytriphenylene, glycidyl-3-(pentadecadienyl)phenyl ether, 4-t-butylphenylglycidyl ether, triphenylolmethane triglycidyl ether, [(4-(1-heptyl-8-[3-(oxiranylmethoxy)phenyl]-octyl) phenoxy)methyl]oxirane, tetraphenylolethane tetraglycidyl ether, hydroxyphenol diglycidyl ether, etc.

Examples of aliphatic oxides include ethylene oxide, propylene oxide, butylene oxides, including isobutylene oxide, 1,2-butylene oxide and 2,3-butylene oxide, pentylene oxide, cyclohexene oxide, decyl glycidyl ether, and dodecyl glycidyl ether.

Examples of alkylene carbonates include those compounds having the formula

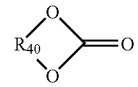

where $R_{40}$ is $C_2$–$C_4$ alkyl where the aliphatic ring carbons are unsubstituted or substituted with a group selected from $C_1$–$C_{10}$ alkyl, $C_6$–$C_{10}$ aryl, or $C_6$–$C_{15}$ aralkyl group. Examples of alkylene carbonates are ethylene carbonate, propylene carbonate, and butylene carbonates.

The reaction of the diol and dianhydride can take place in a media which includes a solvent, or mixture of solvents, in which the polyester with the desired molecular weight is insoluble or, in some instances, in the absence of solvent, for example, in the process where the dianhydride, diol, and hydroxyl-forming compound are mixed together, the hydroxyl-forming compound can function as a solvent, whether as in liquid form or, for example, when solid, for example, ethylene carbonate, by heating to its melting temperature, the reactants are in a liquid. Examples of solvents that are useful include dioxane, acetonitrile, mixture of tetrahydrofuran (THF)/acetonitrile, and mixture of THF/dioxane. It is useful to use a media where the dianhydride and diol are soluble and the polyester is not so that as the reaction progresses, the formed polyester will precipitate out of solution.

The temperature at which the reactions occur generally ranges from about room temperature to about 170° C. The reaction time can vary from about 4 to about 48 hours.

Where the dianhydride, diol, and hydroxyl-forming compound selected from aromatic oxide, aliphatic oxide, alkylene carbonate, and mixtures thereof are mixed together under reaction conditions to react the dianhydride with the diol, the dianhydride and the diol being present in substantially stoichiometric amounts, the mixing optionally occurring in a media in which the polyester is insoluble, the reaction conditions are typically a reaction time of from about 3 to about 24 hours at a temperature ranging from about 50 to about 140° C. Optionally, to continue the reaction with the formed polyester and the hydroxyl-forming compound, a catalyst can be added to the mixture. The temperature of the mixture can be the same as that used to react the dianhydride with the diol or a different range of, for example, from about 60 to about 170° C. The reaction time can range from 4 to 24 hours.

Processing the polyester with a hydroxyl-forming compound can result in either generally linear polyesters or partially crosslinked polyesters, depending upon the temperature at which the hydroxyl-forming compound is reacted with the polyester. Generally, if the reaction temperature is about less than or equal to 80° C., the resulting polyester is generally linear. Generally, if the reaction temperature is about greater than or equal to 80° C., the resulting polyester generally has some partial crosslinking occurring.

The reaction of the hydroxyl-forming compound and polyester is normally carried out at atmospheric pressure under inert gas atmosphere. However, if the hydroxyl-forming compound has a boiling point lower than the reaction temperature and no additional solvent is used, increased pressure can be used.

Typical weight average molecular weights of the polyesters prepared by the present process range from about 5,000 to about 300,000.

Recovery of the polyester from the reaction media can be done by conventional methods. For example, the reaction mixture containing the polyester as a precipitate can be filtered to remove the solid polymer. The solid monomer can then be rinsed with water or ether. The polyester also can be isolated by pouring the reaction mixture into a non-solvent for the polyester and collecting the precipitated product. Additionally, the polyester can be isolated by removal of the solvent by vacuum distillation.

While the reaction between the dianhydride and diol typically does not need the presence of a catalyst, catalysts which are well known to those skilled in the art can be added to increase the reaction rate. A catalyst can optionally be used when reacting the polyester (from the reaction between dianhydride and diol)) with either the capping compound or the hydroxyl-forming compound. Examples of suitable catalysts include onium salts, for example, phosphonium, ammonium, or sulfonium salts. Examples include benzyltributylammonium chloride, benzyltriethylammonium chloride, and benzyltrimethylammonium chloride. When reacting the polyester with the capping compound, inorganic acids such as sulfuric acid can also be used.

The polyesters made by the present inventive process are useful in compositions in the coatings, adhesives, sealants, elastomers, and photolithography fields. The polyesters prepared by this process can also be used in preparing barrier containers and films, and as molding, extrusion and casting resins, in fabricating molded, extruded or foamed articles, containers, films, film laminates, or coatings using conventional fabricating techniques such as extrusion, compression molding, injection molding, blow molding and similar fabrication techniques commonly used to produce such articles. Examples of such articles include films, foams, sheets, pipes, rods, bags and boxes.

In the photolithography field, for example, in certain instances, it is important to control the etch resistance and absorptivity of an antireflective coating. In order to provide the desired etch rate of the antireflective coating, especially for imaging below 200 nm, the degree of aromaticity in the polymer may be varied. For high etch rates the B component in the polyester is preferably nonaromatic. It is generally known to those of ordinary skill in the art that aromatics decrease the etch rate. For low etch rates and/or high absorptivity, highly aromatic polyesters are desirable, where the B component may be highly aromatic. However, in some embodiments, particularly for imaging at wavelengths below 200 nm, optimum performance may be obtained by controlling the etch rate and the absorptivity by using an aliphatic monomer for B or an appropriate mixture of an aliphatic and an aromatic monomer. The aromatic functionality may also be incorporated at other functional points within the polyester.

After the polyester is prepared, it can then be formulated into, for example, an antireflective coating composition for use in the photolithography field. Such antireflective coating compositions typically comprise a polyester made by the process of the present invention, together with following materials which are well known to those skilled in the art—a crosslinking agent, an acid or/and an acid generator, and a solvent, plus if needed other additives such as, for example, monomeric dyes, lower alcohols, surface leveling agents, adhesion promoters, antifoaming agents, etc.

In order to form a good antireflective coating from the antireflective coating composition, the polyester should be soluble in the solvent of the composition. Additionally, after baking the antireflective composition to form the antireflective coating, the formed coating should not be soluble in the solvent of the photoresist, which is to be coated in top of the antireflective coating, and further, the antireflective coating should also not be soluble in the aqueous developer solution used to develop the photoresist. The optimum structure of the polyester, having all the necessary properties, may be developed using various strategies, for example, using a mixture of dianhydrides and diols.

The amount of the polyester made by the present invention can be used in, for example, antireflective coating compositions, in amounts that can range from about 95 weight % to about 50 weight %, preferably about 85 weight % to about 70 weight % and more preferably about 80 weight % to about 70 weight %, relative to the solid portion of the composition.

The following examples provide illustrations of the process of making the polyesters of the present invention. These examples are not intended, however, to limit or restrict the scope of the invention in any way and should not be construed as providing conditions, parameters or values which must be utilized exclusively in order to practice the present invention.

EXAMPLE 1

1.0 mole of pyromellitic dianhydride was suspended in 300 g of acetonitrile in a 2 L-flask with a condenser and a mechanical stirrer. Then 1.05 moles of ethylene glycol was added. Under nitrogen, the mixture was heated to a gentle reflux. The reaction was continued for 24 hrs. After cooling the reaction mixture to room temperature, stirring was continued for a few additional hours. A white precipitate formed during the reaction and was collected by suction and washed thoroughly with acetonitrile. The solid was dried in a vacuum oven for 1 day. Yield: about 90%. The polymer had a weight average molecular 41,100 g/mol.

EXAMPLE 2

1.0 mole of pyromellitic dianhydride was suspended in 300 g of acetonitrile in a 2 L-flask with a condenser and a mechanical stirrer. Then 1.00 moles of ethylene glycol was added. Under nitrogen, the mixture was heated to a gentle reflux. The reaction was continued for 24 hrs. After cooling the reaction mixture to room temperature, stirring was continued for a few additional hours. A white precipitate formed during the reaction and was collected by suction and washed thoroughly with acetonitrile. The solid was dried in a vacuum oven for 1 day. Yield: about 90%. The polymer had a weight average molecular 269,00 g/mol.

EXAMPLE 3

0.2 moles of 3,3',4,4'-benzophenone-tetracarboxylic dianhydride and 0.2 moles of 3,6-dithioctane-1,8-diol were suspended in 250 g of a cetonitrile in a 1 L-flask with a condenser and a mechanical stirrer. Under nitrogen, the mixture was heated to a gentle reflux. The reaction was maintained for 24 hours. A polymer precipitated out during the reaction. After the reaction mixture was cooled to room temperature, the polymer was collected by suction. The polymer was redissolved in 300 ml of acetone and reprecipitated from water. The polymer was collected and washed thoroughly with water. Finally the polymer was dried in a vacuum oven. The overall yield for the polymer was about 65%. The polymer obtained had a weight average molecular weight of about 5,830 g/mol.

EXAMPLE 4

300 g of propylene oxide and 300 g of acetonitrile were charged into a 2 L flask with a magnetic bar and a condenser. To this were added 50 g of the polymer prepared from Example 1 and 2.5 g of benzyltriethylammonium chloride. Under nitrogen, the reaction mixture was heated to a gentle reflux. The reaction was maintained for 24 hours. After cooling to room temperature, the reaction solution was poured slowly into large amounts of water while stirring. A polymer was collected by suction and washed thoroughly with water and finally dried in vacuum oven for 1 day. The overall yield was a bout 80%. The polymer obtained had a weight average molecular weight of about 43,200 g/mol.

EXAMPLE 5

300 g of styrene oxide and 100 g of acetonitrile were charged into a 2 L flask with a magnetic bar and a condenser. To this were added 50 g of the polymer prepared from Example 2 and 3 g of benzyltriethylammonium chloride. Under nitrogen, the reaction mixture was heated to a gentle reflux. The reaction was maintained for 24 hours. After cooling to room temperature, the reaction solution was poured slowly into large amounts of water while stirring. A polymer was collected by suction and washed thoroughly with water and finally dried in vacuum oven for 1 day. The overall yield was a bout 80%. The polymer obtained had a weight average molecular weight of about 23,800 g/mol.

EXAMPLE 6

2.0 mole of pyromellitic dianhydride was suspended in 300 g of acetonitrile in a 5 L-flask with a condenser and a mechanical stirrer. Then 2.10 moles of ethylene glycol was added. Under nitrogen, the mixture was heated to a gentle reflux. The reaction was continued for 24 hrs. After cooling the reaction mixture to room temperature, stirring was continued for a few additional hours.

To the above reaction solution were added 1,500 g of propylene oxide and 8 g of benzyltriethylammonium chloride. Under nitrogen, the reaction mixture was heated to a gentle reflux. The reaction was maintained for 24 hours. After cooling to room temperature, the reaction solution was poured slowly into large amounts of water while stirring. The polymer was collected by suction and washed thoroughly with water and finally dried in vacuum oven for 1 day. The overall yield was about 85%. The polymer obtained had a weight average molecular weight of about 25,200 g/mol.

EXAMPLE 7

250 g of the polyester polymer prepared in Example 2 were dissolved in a mixture of 750 g of methanol and 750 g of ethyl lactate in a flask. 20 g of concentrated sulfuric acid was added as catalyst. The solution was heated to a gentle reflux. The reaction was maintained for 22~24 hours. After cooling to room temperature, the solution was slowly poured into a large amount of water in a high speed blender. A white polymer obtained was collected by filtration and washed thoroughly with water. Finally, the polymer was dried in a vacuum oven for 1 day. The overall yield was about 50%. The polymer obtained had a weight average molecular weight of 16,900 g/mol.

EXAMPLE 8

300 g of ethylene carbonate were warmed to liquid in a 2 L flask with a mechanical stirrer. To this was added 100 g of the polymer prepared in Example 2 and 4.0 g of benzyltriethylammonium chloride. The mixture was heated to 130° C. under nitrogen. The reaction was maintained at this temperature until all the polymer was dissolved and a clear solution obtained. After cooling to room temperature, the reaction solution was slowly poured into large amount of water while stirring. A precipitated polymer was collected, washed thoroughly with water and finally dried in a vacuum oven. The polymer obtained had a weight average molecular weight of 41,000 g/mol.

EXAMPLE 9

1.0 mole of pyromellitic dianhydride was dissolved in 600 g of ethylene carbonate in a 1 L-flask with a mechanical stirrer. Then 1.0 mole of ethylene glycol was added. Under nitrogen, the reaction mixture was heated to 120° C. The reaction was continued for 8 hrs. Then 10 g of benzyltriethylammonium chloride was added and the reaction was continued for another 22 hrs at the same temperature. The reaction solution was cooled and filtered. The filtrate was slowly poured into a large amount of water while stirring. A white polymer was collected by filtration and washed thoroughly with water, followed by drying in a vacuum oven. The polymer obtained had a weight average molecular weight of 112,300 g/mol.

EXAMPLE 10

500 g of ethylene carbonate were warmed to liquid in a 2 L flask with a mechanical stirrer. To this were added 0.44 moles of pyromellitic dianhydride and 0.44 moles of 2-bromo-2-nitro-1,3-propanediol. The mixture was heated to 80° C. under nitrogen. The reaction was maintained at this temperature for 7 hours. Then 5 g of benzyltriethylammonium chloride were added and the temperature was raised to 130° C. The reaction was maintained at this temperature for 22 hrs. After cooling to room temperature, the reaction solution was slowly poured into a large amount of water while stirring. A precipitated polymer was collected, washed thoroughly with water and finally dried in a vacuum oven. The overall yield was about 70%. The polymer obtained had a weight average molecular weight of about 26,500 g/mol.

EXAMPLE 11

300 g of ethylene carbonate were warmed to liquid in a 1 L flask with a mechanical stirrer. To this was added 0.31 mole of pyromellitic dianhydride, 0.031 mole of 1-phenyl-1,2-ethanediol and 0.279 mole of 2-bromo-2-nitro-1,3-propanediol. The mixture was heated to 80° C. under nitrogen. The reaction was maintained at this temperature for 23 hours. Then 4.0 g of benzyltriethylammonium chloride was added and the temperature was raised to 110° C. The reaction was maintained at this temperature for 7 hrs. After cooling to room temperature, the reaction solution was slowly poured into large amount of water while stirring. A precipitated polymer was collected, washed thoroughly with water and finally dried in a vacuum oven. The polymer obtained had a weight average molecular weight of 44,100 g/mol.

EXAMPLE 12

An antireflective coating composition was prepared by dissolving 2.4 g of polymer prepared in Example 6, 0.72 g of tetrakis (methoxymethyl)glycoluril, 0.048 g triethylammonium salt of 10-camphorsulfonic acid in 47.6 g ethyl lactate. The solution was filtered through 0.2 μm filter.

The performance of the anti-reflective coating formulation was evaluated using AZ® EXP AX1020P photoresist (available from AZ Electronic Materials, Clariant Corporation, Somerville, N.J.). A 108 nm antireflective coating film from the above solution was coated on a silicon wafer and baked at 200° C. for 60 seconds. The antireflective film was found to have (n) value of 1.51 and (k) value of 0.26. Using AZ® EXP AX1020P photoresist a 330 nm film was coated and baked at 115° C. for 60 seconds. The wafer was then imagewise exposed using an ISI 193 nm ministepper with 0.6NA, 0.7 sigma, under conventional illumination with binary mask. The exposed wafer was baked at 110° C. for 60 seconds and developed using a 2.38 weight % aqueous solution of tetramethyl ammonium hydroxide for 60 seconds. At an exposure dose of 16 mJ/cm2, the line and space patterns at 0.13 micron were observed under scanning electron microscope and showed no standing waves indicating the efficacy of the bottom anti-reflective coating.

In photolithography, the use of bottom antireflective coating provides the best solution for the elimination of reflectivity. The bottom antireflective coating is applied to the substrate prior to coating with the photoresist and prior to exposure. The resist is exposed imagewise and developed. The antireflective coating in the exposed area is then etched, typically in an oxygen plasma, and the resist pattern is thus transferred to the substrate. The etch rate of the antireflective film should be relatively high in comparison to the photoresist so that the antireflective film is etched without excessive loss of the resist film during the etch process. It is preferred to have a bottom antireflective coating that functions well at exposures less than 230 nm. Such antireflective coatings need to have high etch rates and be sufficiently absorbing to act as antireflective coatings. U.S. Pat. No. 5,935,760 describes a bottom antireflective coating based on a very specific crosslinkable polyester polymer.

This application is related to applicants' copending patent application Ser. No. 10/301,462, filed Nov. 21, 2002, the contents of which hereby incorporated by reference.

This invention claimed is:

1. A process for making a polyester which comprises reacting a dianhydride with a diol, optionally in the presence of a catalyst, in a solvent media such that the polyester precipitates out as it is formed, the solvent media selected from the group consisting of dioxane, acetonitrile, mixture of tetrahydrofuran/acetonitrile, and mixture of tetrahydrofuran/dioxane, the dianhydride and the diol being present in substantially stoichiometric amounts.

2. The process of claim 1 which comprises an additional step of partially or fully esterifying carboxyl groups on the polyester with a capping compound selected from monohydric alcohols and mixtures thereof optionally in the presence of a catalyst.

3. The process of claim 1 which comprises an additional step of converting some or all carboxyl groups on the polyester to hydroxyl groups by reacting the carboxyl groups with a hydroxyl-forming compound selected from aromatic oxide, aliphatic oxide, alkylene carbonate and mixtures thereof optionally in the presence of a catalyst.

4. The process of claim 3 wherein the polyester formed after the reaction of the carboxyl groups is partially crosslinked.

5. The process of claim 3 wherein the polyester formed after the reaction of the carboxyl groups is generally linear.

6. The process of claim 1 wherein the dianhydride is a mixture of one or more dianhydrides.

7. The process of claim 1 wherein the diol is a mixture of one or more diols.

8. A process for making a polyester which comprises:
   (i) reacting a dianhydride with a diol, optionally in the presence of a catalyst, in a solvent media such that the polyester precipitates out as it is formed, the solvent media selected from the group consisting of dioxane, acetonitrile, mixture of tetrahydrofuran/acetonitrile, and mixture of tetrahydrofuran/dioxane, the dianhydride and the diol being present in substantially stoichiometric amounts;
   (ii) separating the polyester from the media of step (i); and
   (iii) partially or fully esterifying carboxyl groups on the polyester of step (ii) with a capping compound selected from monohydric alcohols and mixtures thereof optionally in the presence of a catalyst.

9. A process for making a polyester which comprises:
   (i) reacting a dianhydride with a diol, optionally in the presence of a catalyst, in a solvent media such that the polyester precipitates out as it is formed, the solvent media selected from the group consisting of dioxane, acetonitrile, mixture of tetrahydrofuran/acetonitrile, and mixture of tetrahydrofuran/dioxane, the dianhydride and the diol being present in substantially stoichiometric amounts;
   (ii) separating the polyester from the media of step (i); and
   (iii) converting some or all carboxyl groups on the polyester of step (ii) to hydroxyl groups by reacting the carboxyl groups with a hydroxyl-forming compound selected from aromatic oxide, aliphatic oxide, alkylene carbonate and mixtures thereof optionally in the presence of a catalyst.

10. The process of claim 9 wherein the dianhydride is a mixture of one or more dianhydrides.

11. The process of claim 9 wherein the diol is a mixture of one or more diols.

12. The process of claim 9 wherein the hydroxyl-forming compound is selected from styrene oxide, propylene oxide, ethylene carbonate and mixtures thereof.

13. The process of claim 9 wherein the polyester formed after the reaction of the carboxyl groups is partially crosslinked.

14. A process for making a polyester which comprises:
   (i) reacting a dianhydride with a diol, optionally in the presence of a catalyst, in a solvent media such that the polyester precipitates out as it is formed the solvent media selected from the group consisting of dioxane, acetonitrile, mixture of tetrahydrofuran/acetonitrile, and mixture of tetrahydrofuran/dioxane, the dianhydride and the diol being present in substantially stoichiometric amounts; and
   (ii) partially or fully esterifying carboxyl groups on the polyester of step (i) with a capping compound selected from monohydric alcohols and mixtures thereof optionally in the presence of a catalyst.

15. A process for making a polyester which comprises:
   (i) reacting a dianhydride with a diol, optionally in the presence of a catalyst, in a solvent media such that the polyester precipitates out as is formed, the solvent media selected from the group consisting of dioxane, acetonitrile, mixture of tetrahydrofuran/acetonitrile, and mixture of tetrahydrofuran/dioxane, the dianhydride and the diol being present in substantially stoichiometric amounts; and (ii) converting some or all carboxyl groups on the polyester of step (i) to hydroxyl groups by reacting the carboxyl groups with a hydroxyl-forming compound selected from aromatic oxide, aliphatic oxide, alkylene carbonate and mixtures thereof optionally in the presence of a catalyst.

16. The process of claim 15 wherein the dianhydride is a mixture of one or more dianhydrides.

17. The process of claim 15 wherein the diol is a mixture of one or more diols.

18. The process of claim 15 wherein the hydroxyl-forming compound is selected from styrene oxide, propylene oxide, ethylene carbonate and mixtures thereof.

19. The process of claim 15 wherein the polyester formed after reaction of the carboxyl groups is partially crosslinked.

20. A process for making a polyester comprising the steps of:
(i) reacting together a dianhydride, a diol, and a hydroxyl-forming compound selected from aromatic oxide, aliphatic oxide, alkylene carbonate, and mixtures thereof under conditions to react the dianhydride with the diol, the dianhydride and the diol being present in substantially stoichiometric amounts;

(ii) reacting the mixture of (i) under conditions to react carboxyl groups on the polyester with the hydroxyl-forming compound to convert carboxyl groups to hydroxyl groups; and (iii) separating the polyester from step (ii).

21. The process of claim 20 wherein the polyester formed after the reaction of the carboxyl groups is partially crosslinked.

22. The process of claim 20 wherein the dianhydride is a mixture of one or more dianhydrides.

23. The process of claim 20 wherein the diol is a mixture of one or more diols.

24. The process of claim 20 wherein the hydroxyl-forming compound is selected torn styrene oxide, propylene oxide, ethylene carbonate and mixtures thereof.

25. The process of claim 20 wherein a catalyst is added prior to step (ii).

* * * * *